Patented June 9, 1931

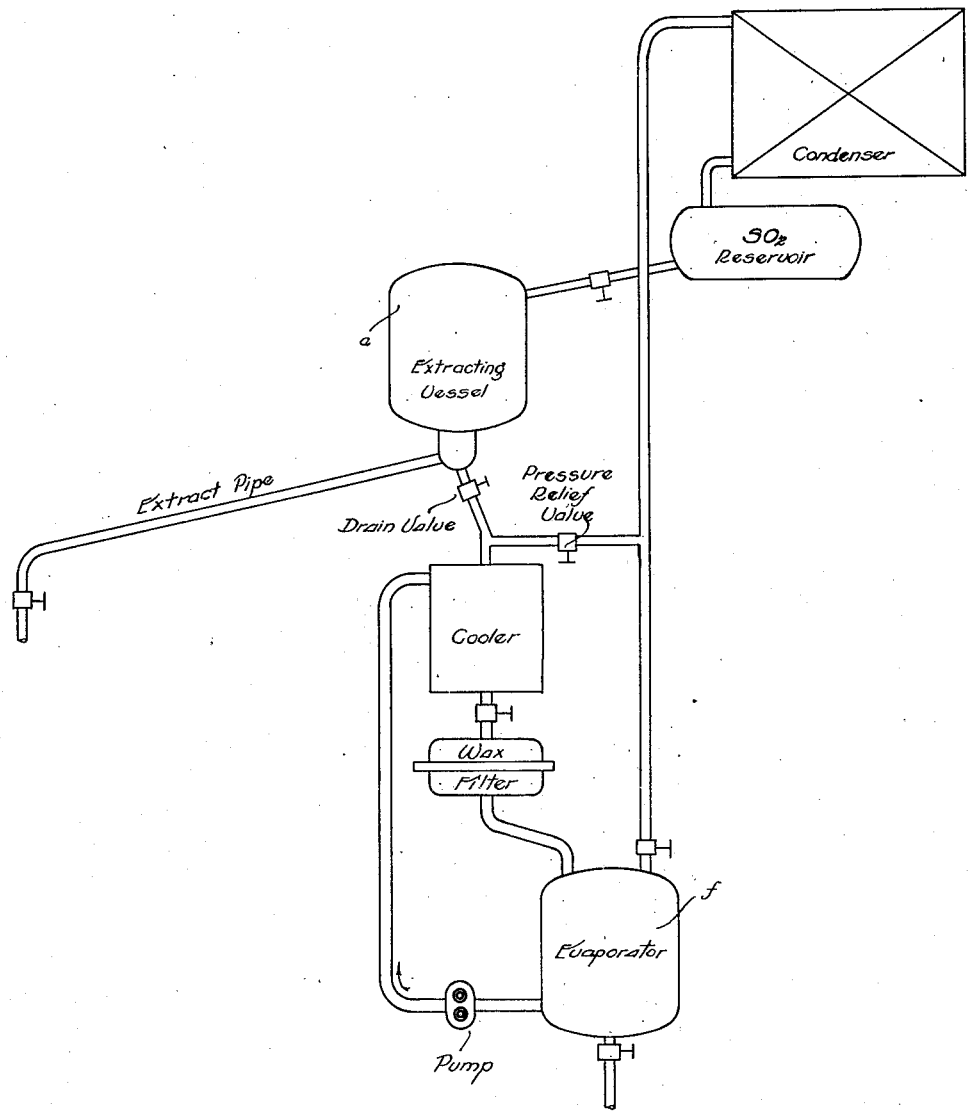

1,809,777

UNITED STATES PATENT OFFICE

LAZAR EDELEANU, OF BERLIN-CHARLOTTENBURG, GERMANY, ASSIGNOR TO EDELEANU GESELLSCHAFT M. B. H., OF BERLIN, GERMANY

DEWAXING MINERAL OILS

Application filed January 11, 1930. Serial No. 420,277.

This invention relates to a new process for use in the art of dewaxing mineral oils, whereby the cloud point and the pour point may be very considerably lowered by saturating the oil with liquefied sulphur dioxide at low temperature and removing the paraffin or wax by any one of several known methods such as pressing, centrifuging, or electrical precipitation. It is especially advantageous that this new method may be utilized in connection with the well known Edeleanu refining process by means of liquefied sulphur dioxide.

The dewaxing process, according to the physical character of the oil at hand, may be conducted in one operation, in a series of successive steps, or in a continuous manner, and by the use of any suitable apparatus, as for example, apparatus similar to that disclosed in my Patent No. 1,526,665.

I have discovered that the presence of liquid $SO_2$ in a mineral oil reduces the solubility of paraffin or wax in the oil. The degree of solubility is greatly influenced by the temperature, and the effect of temperature is especially striking as the temperature at which the operation is conducted is lowered. At a given temperature when dewaxing in a mineral oil by any one of the known methods, a maximum wax separation is obtained which is characterized by a definite cloud point and pour point. By dewaxing the same oil at the same temperature in the presence of liquid $SO_2$, that is, with the oil saturated with liquid $SO_2$, more complete removal of the paraffin or wax is obtained, and this is evidenced and characterized by a considerably lower cloud point and pour point of the finished product.

In addition to making the waxy content of the oil less soluble, the operation of dewaxing is greatly facilitated from a mechanical standpoint by the presence of the liquid $SO_2$, which lowers the viscosity of the oil enormously, making it flow much more readily through the filters and other parts of the apparatus.

Application of the process

The dewaxing operation in the presence of liquid $SO_2$ may be accomplished in connection with the well known Edeleanu process as for instance in my U. S. Patent No. 1,526,665, by placing a suitable cooling and wax removing apparatus just after the mixing devices and before the heat interchangers connected with the refined oil evaporators, as illustrated in the accompanying drawing, wherein the vessels $a$ and $f$ are the extraction vessel and evaporator, respectively, heretofore used as described in said patent. In the refining process referred to the oil is run into a vessel $a$ and mixed with liquid $SO_2$, then the temperature is lowered to $-10°$ C. Two layers separate on standing, the lower consisting of the unsaturates dissolved in the heavy liquid $SO_2$, the upper being the saturates with a small amount of liquid $SO_2$ in solution. The lower layer is drawn away through extract pipe for further treatment. The upper layer is again treated in the same manner, with separation of two layers, the lower being drawn away through extract pipe. After repeated treatments in this manner, what remains in vessel $a$ consists of the pure saturates, or paraffin oils, free from unsaturates.

These treatments have been carried out at low temperature. At these temperatures the wax portion of the paraffin oils will be in the form of solid wax crystals.

Additional liquid $SO_2$ is added to the mixture and it is drained from vessel $a$ into the cooler of the dewaxing process. After the drain valve is closed, the pressure relief valve is opened, allowing surplus $SO_2$ to evaporate and produce self refrigeration of the mixture to still lower temperature. In order to promote the evaporation, further reduction of pressure is necessary. When a temperature of $-15$ to $-25°$ C. is attained the wax is almost completely precipitated as crystals.

The pressure relief valve is now closed and $SO_2$ pressure develops in the cooler, while reduced pressure is brought about in vessel $f$ by the means associated with the refining process, causing the mixture to pass through the wax filter, where the solid wax is deposited, while the liquid paraffin oil passes to vessel $f$ in continuation of the refining process, for evaporation under the reduced pressure to recover the $SO_2$ for use again. The apparatus will permit the refined oil to be cooled to any desired temperature by evaporating off liquid $SO_2$ in contact with $SO_2$ saturated refined oil. The precipitated wax or paraffin may be removed by one of the several known methods. The pump is provided for the purpose of returning the dewaxed mixture from evaporating vessel $f$ to the cooler for further cooling and filtering, this treatment being repeated until the wax has been removed to the desired extent. Thus the process may be conducted in one step, or if conditions justify, the final desired temperature may be obtained by repeating the above operation with successive lowering of temperature at each step. Wax or paraffin may be removed either just before or just after each cooling operation.

The process may also be applied separately from the known Edeleanu process on refined mineral oils containing wax by first saturating the oil with liquid $SO_2$, and thereafter cooling the oil either with or without the addition of more $SO_2$.

Examples

A refined oil obtained from a paraffin base crude petroleum having a pour point of 85° F., (29.4° C.) was pressed through suitable filtering material in the regular manner at −4° F., (−20° C.) and this yielded a product whose cloud point was 32° F., (0° C.) and pour point 25° F., (−3.9° C.). A fresh sample of the same oil was next saturated with liquid $SO_2$ and pressed at the same temperature as the previous one. This operation yielded a product having a cloud point of 22° F., (−5.5° C.) and a pour point of 15° F., (−9.5° C.).

The great influence of temperature is indicated by the following experiment which was carried out on a highly viscous California lubricating oil. The oil saturated with liquid sulphur dioxide was pressed at −13° F., (−25° C.) at which temperature it yielded a product of 2° F., (−16.7° C.) cloud point. When the same saturated oil was pressed at 5° F., (−15° C.) the cloud point was only 12° F., (−11.1° C.). The cloud point of the original oil was 26° F., (−3.3° C.) and the oil was too viscous to be pressed without the addition of liquid $SO_2$.

Having described the purpose of my invention, what I claim to be novel and heretofore unknown in the art of dewaxing mineral oils is:

1. A process of dewaxing mineral oil by the addition of liquid $SO_2$ to a fraction already saturated with liquid $SO_2$ at the existing temperature and pressure to render the wax less soluble, followed by extreme lowering of the temperature to precipitate the wax, and thereafter removing the wax mechanically.

2. A process of dewaxing mineral oil by saturating the oil with liquid $SO_2$, adding liquid $SO_2$ in excess of the saturation point at the temperature of the oil, and thereafter removing the precipitated wax mechanically.

3. The process of dewaxing mineral oils which consists in saturating the oil with liquid $SO_2$; causing some of the liquid $SO_2$ to vaporize in contact with the oil to lower its temperature; and mechanically removing the wax so precipitated.

4. The process of dewaxing mineral oils which consists in saturating the oil with liquid $SO_2$; adding an excess of liquid $SO_2$; lowering the pressure to cause vaporization of liquid $SO_2$ in contact with the oil until a determined temperature is attained; and mechanically removing the wax so precipitated.

5. The process of dewaxing mineral oils which consists in saturating the oil with liquid $SO_2$; adding an excess of liquid $SO_2$; lowering the pressure to cause vaporization of liquid $SO_2$ in contact with the oil until a temperature below −15 degrees C. is attained; and mechanically removing the wax so precipitated.

6. The process of dewaxing mineral oils which consists in taking the upper layer liquid from the known Edeleanu refining process, while saturated with liquid $SO_2$; adding an excess of liquid $SO_2$; lowering the pressure to cause vaporization of liquid $SO_2$ in contact with the oil until a desired temperature is attained; and mechanically removing the wax so precipitated.

7. In the process of separating unsaturated from saturated hydrocarbons by extraction with liquid $SO_2$ at low temperatures, the step of removing wax or paraffin from the saturated fraction by the addition of liquid $SO_2$ after the extraction and at the temperature at which the extraction is made to increase the insolubility of the wax or paraffin, and separating the solid from the liquid constituents.

8. In the process of separating unsaturated from saturated hydrocarbons by extraction with liquid $SO_2$ at low temperatures, removing wax or paraffin from the saturated fraction by the addition of liquid $SO_2$ after the extraction to increase the insolubility of the wax or paraffin, and separating the solid from the liquid constituents, in a series of successive steps, each successive step being conducted at a lower temperature.

In testimony whereof, I have signed my name to this specification.

LAZAR EDELEANU.